US009473256B2

(12) United States Patent
Afkhami et al.

(10) Patent No.: US 9,473,256 B2
(45) Date of Patent: Oct. 18, 2016

(54) DETECTING AND AVOIDING INTERMODULATION INTERFERENCE

(71) Applicant: QUALCOMM Incorporated, San Diego, CA (US)

(72) Inventors: Hassan Kaywan Afkhami, Ocala, FL (US); Purva Rameshchandra Rajkotia, Orlando, FL (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 14/171,825

(22) Filed: Feb. 4, 2014

(65) Prior Publication Data
US 2015/0222371 A1 Aug. 6, 2015

(51) Int. Cl.
H04B 3/54 (2006.01)
H04B 17/16 (2015.01)
H04B 17/17 (2015.01)
H04B 17/19 (2015.01)

(52) U.S. Cl.
CPC ............... H04B 17/16 (2015.01); H04B 3/54 (2013.01); H04B 17/17 (2015.01); H04B 17/19 (2015.01); H04B 2203/5425 (2013.01); H04B 2203/5495 (2013.01)

(58) Field of Classification Search
CPC .. H04B 1/109; H04B 1/1027; H04B 1/1036; H04B 17/16; H04B 17/17; H04B 17/19; H04B 2203/5425; H04B 2203/5495; H04B 3/54
USPC ............... 455/295, 296, 67.13, 67.14, 114.1, 455/115.1; 324/520
See application file for complete search history.

(56) References Cited

U.S. PATENT DOCUMENTS 6,192,109 B1 * 2/2001 Amrany et al. ................ 379/30
6,766,262 B2 7/2004 Martens
6,809,669 B1 * 10/2004 Robinson ...................... 341/131
7,236,807 B1 * 6/2007 Shapira et al. ............. 455/562.1
8,280,442 B2 10/2012 Nakano et al.
8,369,812 B2 2/2013 Lehman (Continued)

FOREIGN PATENT DOCUMENTS

EP 1499033 3/2007
GB 935519 8/1968
WO 2011154087 12/2011

OTHER PUBLICATIONS

"PCT Application No. PCT/US2015/014030 International Search Report", Apr. 30, 2015, 10 pages.

Primary Examiner — Lewis West
(74) Attorney, Agent, or Firm — DeLizio Law, PLLC

(57) ABSTRACT

A first device and a second device may coordinate to determine a power level or frequency in a first frequency band that is associated with causing intermodulation (IM) interference at a second frequency band (e.g., a protected frequency band). An IM interference detection test may include at least a first test signal transmitted from the first device to the second device via a communications medium. The second device may detect for the presence of IM interference associated with the first test signal. A series of test signals may be used to identify power levels and/or frequencies that cause IM interference in the second frequency band. A transmitting device may improve performance by increasing power for particular frequencies up to a power level that maintains IM interference below a threshold level.

27 Claims, 10 Drawing Sheets

(56) References Cited

U.S. PATENT DOCUMENTS

| | | | |
|---|---|---|---|
| 2003/0222652 A1* | 12/2003 | Martens | 324/520 |
| 2007/0249304 A1* | 10/2007 | Snelgrove | H03F 1/0205 |
| | | | 455/127.2 |
| 2008/0133982 A1* | 6/2008 | Rawlins | H03F 1/0211 |
| | | | 714/699 |
| 2010/0158093 A1* | 6/2010 | Thompson et al. | 375/227 |
| 2012/0163508 A1* | 6/2012 | Kuffner | H04L 27/04 |
| | | | 375/340 |
| 2012/0295558 A1 | 11/2012 | Wang et al. | |
| 2012/0326790 A1* | 12/2012 | Stochino | H03F 1/34 |
| | | | 330/278 |
| 2013/0210375 A1* | 8/2013 | Dufrene | H04B 1/525 |
| | | | 455/79 |
| 2013/0234741 A1 | 9/2013 | Mow et al. | |
| 2013/0315286 A1* | 11/2013 | Shad | H04B 3/54 |
| | | | 375/224 |
| 2014/0119197 A1* | 5/2014 | Maca | H04B 17/0085 |
| | | | 370/241 |
| 2015/0091643 A1* | 4/2015 | Kularatna | H03F 1/3247 |
| | | | 330/149 |

* cited by examiner

DETECTING AND AVOIDING INTERMODULATION INTERFERENCE

BACKGROUND

Embodiments of the inventive subject matter generally relate to the field of communications networks, and, more particularly, to intermodulation interference resulting from signals transmitted via a communications network.

Intermodulation (IM) or intermodulation interference is caused when two or more different frequencies are transmitted in a system that has nonlinearities. The nonlinear effect of the system can form additional signals (e.g., IM interference signals) at frequencies that are different from the originally transmitted frequencies. IM interference may occur at frequencies other than known harmonic multiples of the transmitted frequencies. Nonlinearities in the communications system or in devices coupled to the communications system may cause unpredictable IM interference. For example, nonlinearities can create unwanted spurious signals due to intermodulation between a transmitted signal with other nonlinear devices that are coupled to the communications system.

The spurious signals can cause interference for the communications system, or even for other communications systems that operate in other frequency bands. Out of band emissions due to intermodulation may cause interference for devices operating in a different frequency range than the originally transmitted signals. An example of this may include IM interference caused by originally transmitted signals in a powerline communications (PLC) network, where the IM interference overlaps with FM radio signals at frequencies not typically used by the PLC network. Because intermodulation interference caused by devices in a communications system may interfere with protected frequencies, a regulatory agency may limit power in the communications system. However, it may be difficult to predict which transmitted frequencies and power levels will produce IM interference.

SUMMARY

Various embodiments are disclosed in which a first device and a second device coordinate to determine a power level or frequency that is associated with causing IM interference above a threshold interference level. An IM interference detection test may include at least a first test signal transmitted from the first device to the second device via a communications medium. The second device may detect for the presence of IM interference associated with the first test signal. In coordination, the first and second devices may test and detect which power level(s) or frequencies should be avoided to minimize IM interference of a protected frequency band.

In one embodiment, at least a first test signal at a first power level is transmitted as part of an intermodulation (IM) interference detection test. The IM interference detection test may be designed to determine IM interference associated with various power levels of transmissions between the first device and the second device via the communications medium.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
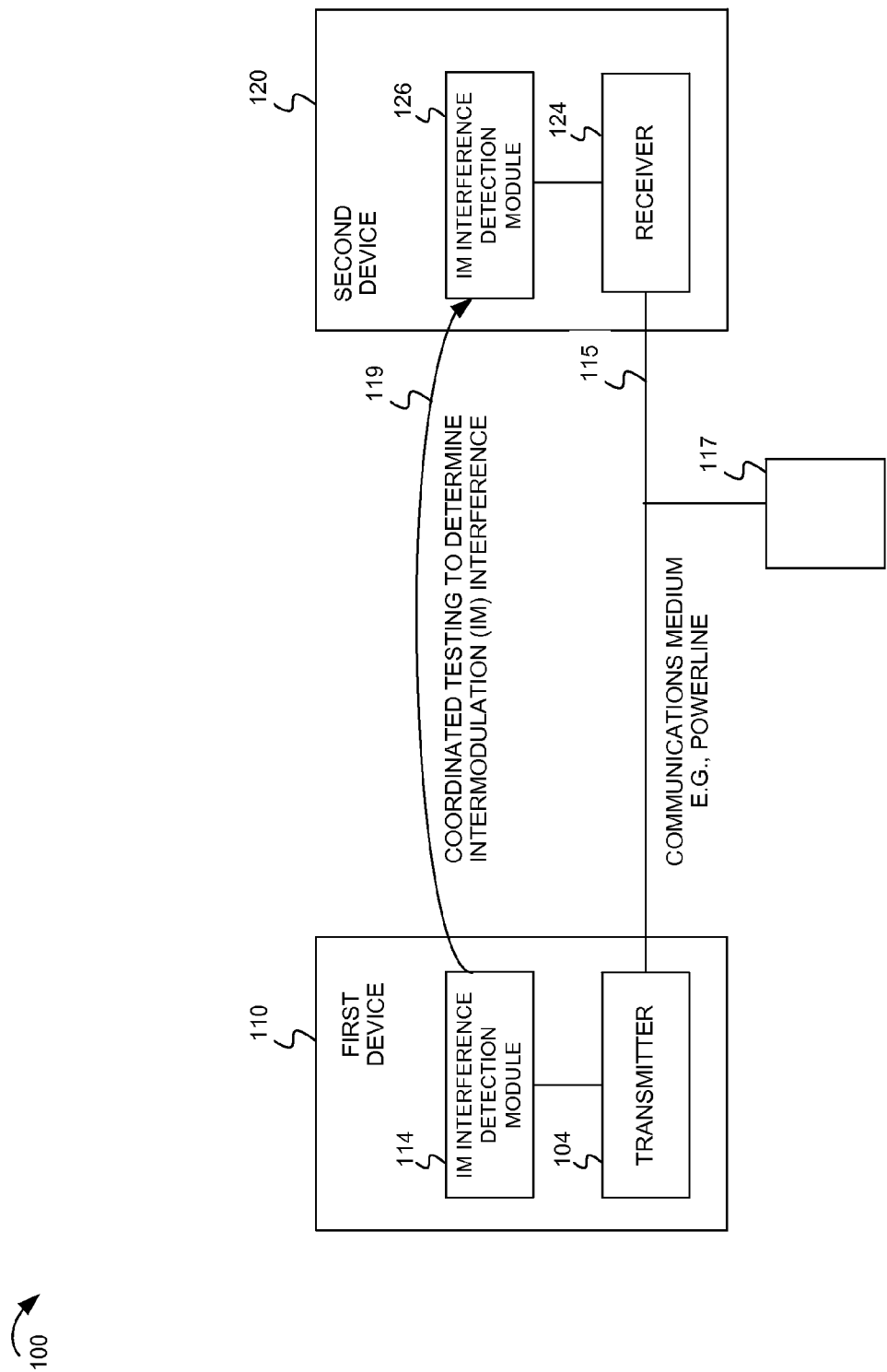
FIG. 1 depicts an example system in which IM interference is determined by coordinated testing in accordance with an embodiment of this disclosure.

The description that follows includes exemplary systems, methods, techniques, instruction sequences and computer program products that embody techniques of the present inventive subject matter. However, it is understood that the described embodiments may be practiced without these specific details. For instance, although examples refer to powerline communications medium, various embodiments may be implemented for other communications medium. In this disclosure, example frequency ranges and frequency bands are provided as examples to aid the reader in understanding the subject matter, and are not intended to limit the scope of the disclosure. In some instances, well-known instruction instances, protocols, structures and techniques have not been shown in detail in order not to obfuscate the description.

Intermodulation (IM) interference may be created as a result of transmitting two or more frequencies in a system that has nonlinearities. Intermodulation between each transmitted frequency component may form additional signals at frequencies that are not just at harmonic frequencies (integer multiples) of the transmitted frequencies, but also at frequencies that are the sum or difference of the transmitted frequencies and at multiples of those sums and differences. It may be difficult to predict which frequencies (or harmonics, sum or differences) will combine to generate IM interference due to the nonlinearities of a communications system. A variety of active or passive components in a communications system may impact intermodulation. For example, a communications medium, or other active devices coupled to the communications medium, may add nonlinearity or additional component frequencies that combine with transmitted frequencies to produce IM interference. Furthermore, passive devices associated with the communications medium (including wiring, antennas, couplers, etc.) may alter the IM interference.

There is concern that IM interference caused in one communications system may impact frequency bands associated with a different communications system. For example, transmissions in a PLC system may cause IM interference for an FM radio signal, even if the transmissions in the PLC system are in a first frequency band that is different from the FM radio frequency band. It may be possible to increase power for a first frequency band up to a maximum power level without causing IM interference (e.g., beyond a threshold interference level for IM interference) for a second frequency band. Furthermore, if particular frequencies of a first frequency band are identified as causing IM interference for a second frequency band, devices transmitting in the first frequency band may limit transmission power for the particular frequencies.

In this disclosure various embodiments are provided in which a first device and a second device may determine which power level(s), frequency, or frequencies are associated with causing IM interference in a protected frequency band. A first device may send one or more test signal(s) in coordination with the second device to detect IM interference in the protected frequency band. In one embodiment, the first device can produce a series of test signals that are suitable for the second device to determine whether any of the utilized frequencies produce IM interference. The second device may have the capability to detect IM interference in the protected frequency band during an IM interference detection test. Stepwise or pattern testing could be performed to test different frequencies or power levels. Once IM interference has been identified, a message could be sent to inform devices coupled to the communications medium to indicate which frequency/power levels have been determined to cause IM interference. The devices coupled to the communications medium may limit power or refrain from transmitting using the identified frequency/power levels.

FIG. 1 depicts an example system 100 in which IM interference is determined by coordinated testing in accordance with an embodiment of this disclosure. A first device 110 and a second device 120 are coupled to a communications medium 115. In the example of FIG. 1, the communications medium 115 is a PLC medium. It is common for PLC medium to include nonlinear components, such as light switches, dimmer switches, power supplies, and the like. The PLC medium may also include passive components that introduce nonlinear effects for transmitted signals passing through the communications medium 115. In the example of FIG. 1, another device 117 is also coupled to the communications medium 115 and may cause IM distortion for the communications path from the first device 110 to the second device 120 via the communications medium 115. The first device 110 includes a transmitter 104 and an IM interference detection module 114. The second device includes a receiver 124 and an IM interference detection module 126.

Nonlinear systems, such as communications medium 115 and other device 117, may generate harmonics, meaning that if the input of a nonlinear system is a signal of a single frequency, $f_A$, then the output is a signal that may include a number of integer multiples of the input frequency, such as $f_A$, $2f_A$, $3f_A$, $4f_A$, and so on. Consider an input signal that contains two frequency components $f_A$ and $f_B$, which may be expressed as $$x(t)=M_a \sin(2\pi f_a t+\phi_a)+M_b \sin(2\pi f_b t+\phi_b) \qquad \text{eq. (1)}$$

where $M_a$ and $\phi_a$ are the amplitude and phase of the first frequency component $f_A$, respectively, and $M_b$ and $\phi_b$ are the amplitude and phase of the second frequency component $f_B$, respectively. The output signal, Y(t), may be obtained by a nonlinear function:

$$Y(t)=G(x(t)) \qquad \text{eq. (2)}$$

Y(t) will contain the two frequencies of the input signal, $f_A$ and $f_B$ (referred to as the fundamental frequencies) as well as a number of linear combinations of the fundamental frequencies, each of the form $$k_A f_A + k_B f_B \qquad \text{eq. (3)}$$

where $k_A$ and $k_B$ are arbitrary integers having positive or negative values. These are referred to as the intermodulation products (or IMPs). In general, each of these frequency components will have a different amplitude and phase, which depends on the specific nonlinear function being used, and also on the amplitudes and phases of the original input components. The 'order' of the intermodulation product is given by $|k_A|+|k_B|$. For example, if the intermodulation product has a frequency component $f_A-f_B$, this would be a second-order intermodulation product (also referred to as IM2).

The calculation of potential IM interference may be possible using the harmonic multiples of the fundamental frequencies as well as a series of sum and difference calculations for different combinations of the fundamental and harmonic multiples thereof. However, the nonlinear function, G(x(t)), may be dependent on other conditions of the communications medium 115 that are unknown to the first device 110 and second device 120 prior to testing. Furthermore, in a multi-carrier system a plurality of frequencies may be transmitted simultaneously, such as an orthogonal frequency division multiplexing (OFDM) transmission. Mathematical determination of the nonlinear function of the communications medium 115 may be complex depending on how many frequencies are transmitted simultaneously.

In accordance with one embodiment of this disclosure, the first device 110 may transmit a first test signal at a first power level. In some implementations, the first test signal may be directed at the second device 120, although in other implementations the first test signal is not addressed to the second device 120. In some implementations, all devices coupled to the communications medium 115 may be aware of the IM interference detection test and detect for the presence of IM interference in coordination with the first test signal. The IM interference detection module 126 may monitor a protected frequency band (which may be outside the normal operating frequency band used on the communications medium 115) to determine if the first test signal is associated with causing IM interference. In some embodiments, the IM interference detection module 126 may be coupled to the communications medium 115 via the receiver 124. In other embodiments, the IM interference detection module 126 may be a separate detection unit that is not coupled to the communications medium 115 via the receiver 124. For example, the IM interference detection module 126 may be coupled to an antenna (not shown) and detects wireless radio signals emanating from the communications medium 115 due to transmission of the first test signal.

As an example, the first device 110 may transmit a first test signal using a 50 MHz frequency signal and a power level of −70 dbM. While the first device 110 transmits the first test signal, the IM interference detection module 126 may detect for intermodulation interference at a protected frequency, such as 100 MHz, that is beyond the operating range of the communications medium 115. The 100 MHz frequency may be within a protected frequency band associated with FM radio signals. The IM interference detection module 126 may compare a first signal strength (e.g., measured while the first test signal is transmitted) with a baseline signal strength (e.g., measured when the first test signal is not transmitted) to determine if the transmission of the first test signal resulted in IM interference. Various detection devices may be used to detect IM interference associated with a first test signal.

The detection devices may operate more effectively if the IM interference detection module 126 knows which frequencies are transmitted in the first test signal. Therefore, the IM interference detection module 126 and the IM interference test module 114 may coordinate with each other to share information about the first test signal. For example, timing/synchronization information may be exchanged prior to transmitting the first test signal so that the IM interference detection module 126 can detect for the IM interference during the time that the first test signal is being transmitted, including any propagation delay that may be associated with the communications medium 115. Furthermore, the IM interference detection module 126 and IM interference test module 114 may communicate information about the transmitted frequencies and associated power levels included in the first test signal.

In accordance with embodiments of this disclosure, an IM interference detection test may include a series (or sequence) of test signals. Various combinations, stepwise, or pattern sequences may be used in a plurality of test signals to determine which power levels are associated with causing IM interference for a protected frequency band. In some embodiments, the series of test signals may be used to determine particular frequencies that are contributing to the IM interference.

In addition to physical layer transmissions of the test signals, the first device 110 and second device 120 may communicate messages with each other or with other devices to detect and identify power levels and frequencies that are associated with causing IM interference for a protected frequency band. Messages may include test setup messages, test acknowledgment messages, test results messages, or the like. The messages may be communicated via media access control (MAC) layer protocol, network protocol, or upper layer protocol. Various examples of messages are further described below in FIGS. 6 and 7.

Figure 2:
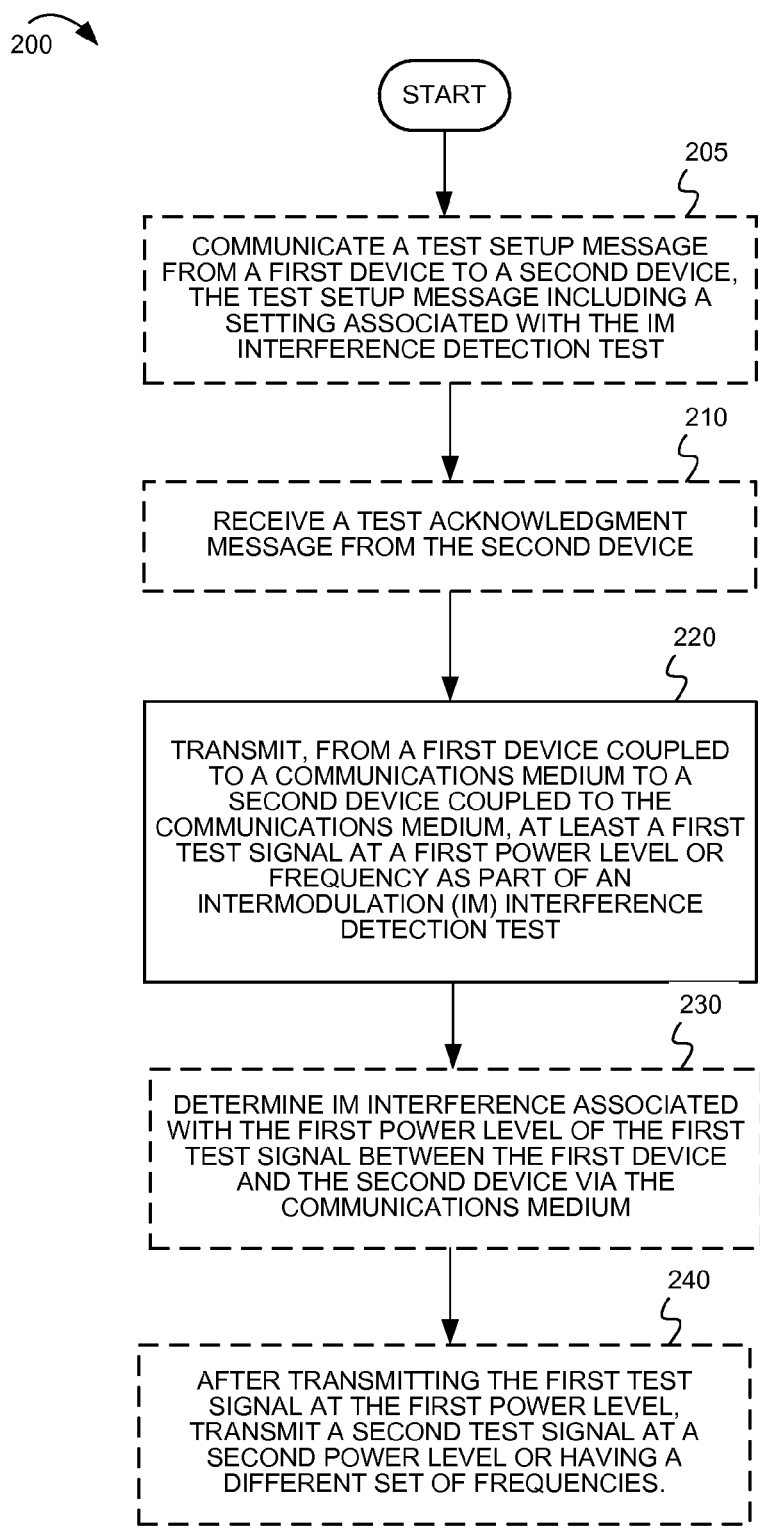
FIG. 2 depicts example operations associated with an IM interference detection test in accordance with an embodiment of this disclosure.

FIG. 2 depicts example operations 200 associated with an IM interference detection test in accordance with an embodiment of this disclosure. Various operations, described as blocks, are optional and may be omitted in some embodiments.

At block 205, a first device may communicate a test setup message from the first device to a second device, the test setup message including a setting associated with the IM interference detection test. For example, the test setup message may identify the IM interference detection test, indicate particular power levels or test frequencies, or provide timing information. In some embodiments, the test setup message may be included in a discovery protocol to determine whether the second device has a capability to detect for IM interference. The test setup message may be a broadcast message or a unicast message.

At block 210, the first device may receive a test acknowledgment message (which may be referred to as a test confirmation message, or acceptance message) from the second device. The test acknowledgment message may also indicate capabilities of the second device. In some embodiments, the test acknowledgment message may identify particular test frequencies or power levels that are requested for testing. For example, the second device may manage the IM interference detection test based on previous test results or tests from other transmitting devices.

At block 220, the first device may transmit, from the first device to a second device coupled to the communications medium, at least a first test signal at a first power level or frequency as part of an intermodulation (IM) interference detection test. The IM interference detection test may be designed to determine IM interference associated with various power levels of transmissions between the first device and the second device via the communications medium.

At block 230, the first device may determine IM interference associated with the first power level of the first test signal between the first device and the second device via the communications medium. For example, the second device may communicate a message (unicast, multicast, or broadcast) indicating results of the IM interference detection test. The first device may receive a results message from the second device responsive to the IM interference detection test, the results message indicating that IM interference was detected above a threshold interference level in association with an identified power level, an identified frequency, or an identified combination power level and frequency.

At block 240, after transmitting the first test signal at the first power level, the first device may transmit a second test signal at a second power level or having a different set of frequencies. In one embodiment, the first device may iteratively sent test signals according to a pattern or stepwise sequence in order to identify power levels or frequencies that are associated with causing IM interference.

Figure 3:
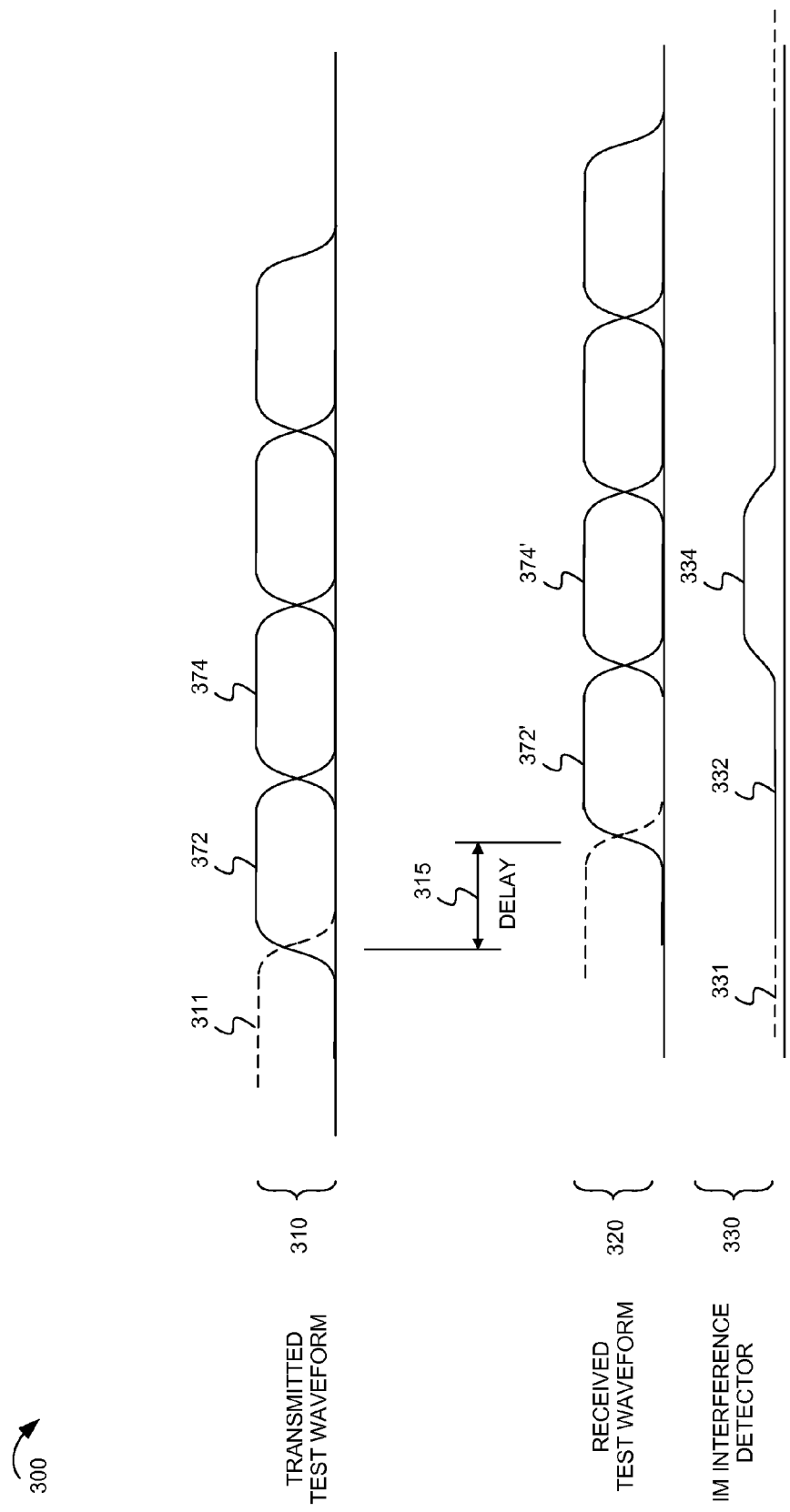
FIG. 3 depicts timing diagrams for an example IM interference detection test in accordance with an embodiment of this disclosure.

FIG. 3 depicts timing diagrams 300 that include a first timing diagram 310 showing a transmitted test waveform. A second timing diagram 320 depicts the received test waveform. It may be understood that a delay 315 may be associated with propagation delay from when the transmitted test waveform is first transmitted by the first device until when the received test waveform is received by the second device. A third timing diagram 330 illustrates measurements of IM interference as detected by an IM interference detection module.

In one embodiment, a preamble or previous communication 311 may precede a first test signal 372. The first test signal 372 may be received by the second device as the received first test signal 372' after a determinable delay 315. As shown at 332, the IM interference detector may not detect IM interference associated with the received first test signal 372'. The power level of the protected frequency band at 332 may be the same as a baseline power level of the protected frequency band measured at 331 prior to the start of the IM interference detection test.

In the example of FIG. 3, a second test signal 374 is transmitted following the first test signal 372. Although shown sequentially in time in FIG. 3, it should be understood that the plurality of test signals may not follow immediately after one another. The second test signal 374 may include a different set of frequencies as were included in the first test signal 372. Alternatively, the second test signal 374 may be transmitted at a different power level than the first test signal 372.

The second test signal 374 is received by the second device as received second test signal 374'. At about the same time as (or in association with the timing of) receiving the received second test signal 374', the IM interference detection module may detect a greater power level (shown at 334) of the protected frequency band.

By monitoring the protected frequency band in coordination with receiving the test signals 372, 374, and measuring the increase in power level 334 of the protected frequency band, the second device may infer that the second test signal 374 produced IM interference while the first test signal 372 did not produce IM interference. The second device may send feedback regarding the detected IM interference to the first device so that the first device can determine which test signal is associated with causing IM interference. Knowing the test signal that caused IM interference, the first device can determine the power level and/or frequency that is different in the second test signal from the first test signal to determine the characteristic that caused the IM interference. Alternatively, the second device may have a priori information about the characteristics of the test signals and may determine which frequency and power level is associated with causing the IM interference.

In some embodiments, a series of test signals may be transmitted to determine different relationships between test signals and the detected IM interference. The test signals may be used to incrementally increase power level of the test signals until IM interference is detected. By this coordinated testing, the first device may converge on a maximum power level which does not produce IM interference for the protected frequency band.

Figure 4:
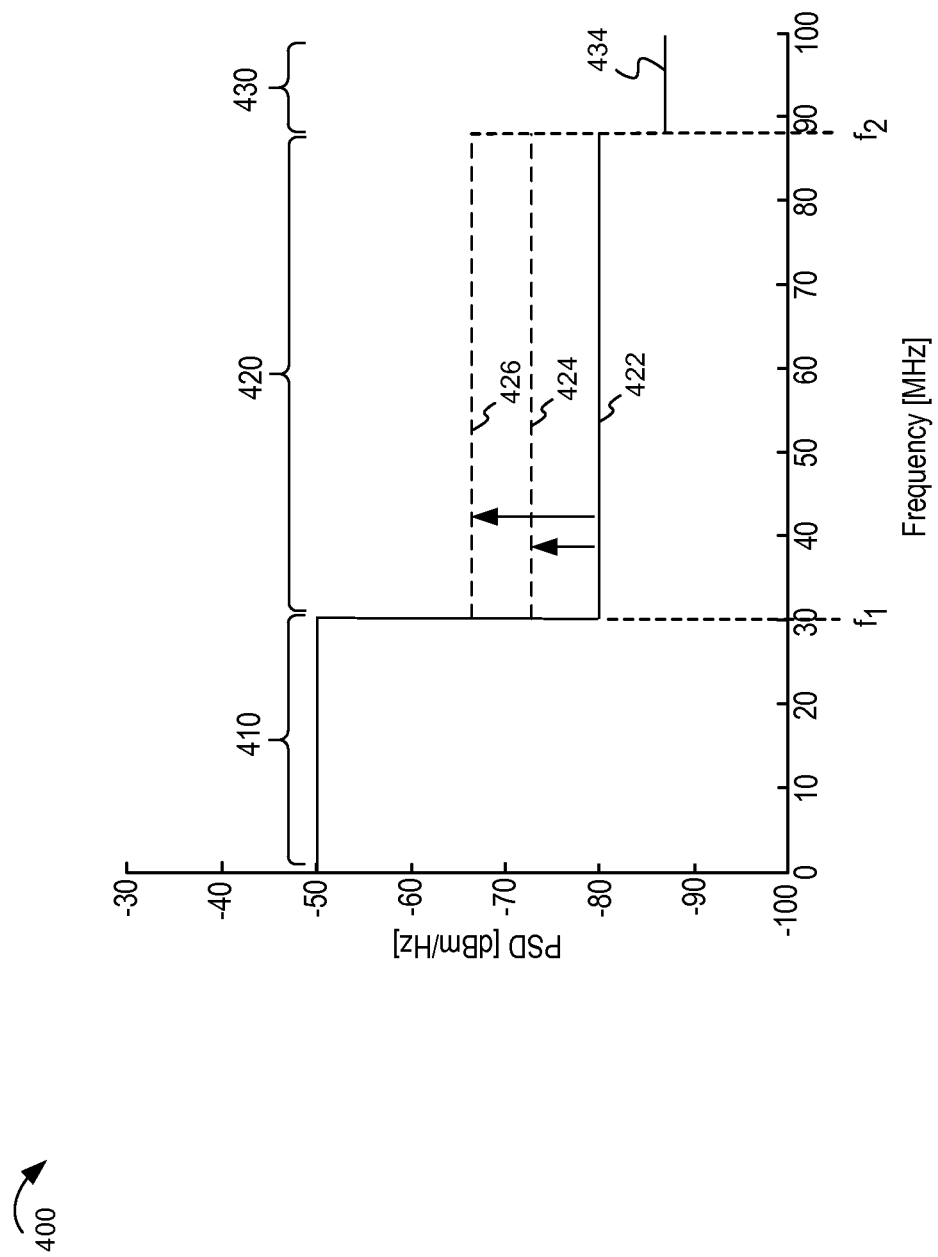
FIG. 4 depicts a frequency diagram and an example IM interference detection test using power levels in accordance with an embodiment of this disclosure.

FIG. 4 depicts an example frequency diagram 400 to illustrate an example IM interference detection test. The example frequency diagram 400 includes a first frequency band 410, a second frequency band 420, and a third frequency band 430. In the example, the first frequency band 410 includes frequencies below a particular frequency, f1 (30 MHz in the example of FIG. 4). The first frequency band 410 may be associated with typical operating frequency range for a PLC medium in an example jurisdiction. The second frequency band 420 includes frequencies from f1 to f2 (30 MHz to 88 MHz in the example of FIG. 4). The third frequency band 430 may include frequencies above f2.

In the example scenario in FIG. 4, a regulatory agency may allocate the third frequency band 430 as a protected frequency band. For example, the frequencies of third frequency band 430 may be associated with FM broadcast radio transmissions. Therefore, other communications systems are not allowed to use those frequencies in the example scenario. However, the second frequency band 420 may be permissible for use by a PLC network as long as transmissions in the second frequency band 420 do not cause IM interference for frequencies in the third frequency band 430. Therefore, a transmitting device may improve performance by increasing power in the second frequency band 420, but must also protect the protected frequencies in the third frequency band 430.

In the example IM interference detection test, a transmitting device may observe changes to detected IM interference of the third frequency band 430 while incrementally increasing the power level of transmitted test signals in the second frequency band 420. For example, the first device may transmit a first test signal with frequencies in the second frequency band 420 at a first power level 422, meanwhile the second device monitors for IM interference in the third frequency band 430. If, for the first test signal, the second device does not detect IM interference above a threshold interference level 434, then the first device may transmit a second test signal with frequencies in the second frequency band 420 at a second power level 424. A third test signal may be transmitted using a third power level 426.

At some point, the second device may detect IM interference associated with one of the test signals. For example, if the third test signal at the third power level 426 is received by the second device at about the same time the second device detects IM interference of the third frequency band 430 above a threshold interference level, then the second device may indicate that the third power level 426 is associated with causing IM interference. The first device may then transmit subsequent transmissions using the second power level 424 to prevent causing IM interference. The first device may experience improved performance by increasing the power of subsequent transmissions in the second frequency band 420 from the first power level 422 to the second power level 424 without causing IM interference for the third frequency band 430.

In the example of FIG. 4, the power level was changed for each of the plurality of test signals. This approach may be well suited for a transmitting device that has limited ability to selectively reduce power on individual frequencies. Such a transmitting device may reduce the transmit level on the entire second frequency band 420. The transmitting device may control transmit level separately on the first frequency band 410 and second frequency band 420 depending on transmitter capabilities and regulatory requirements.

Figure 5:
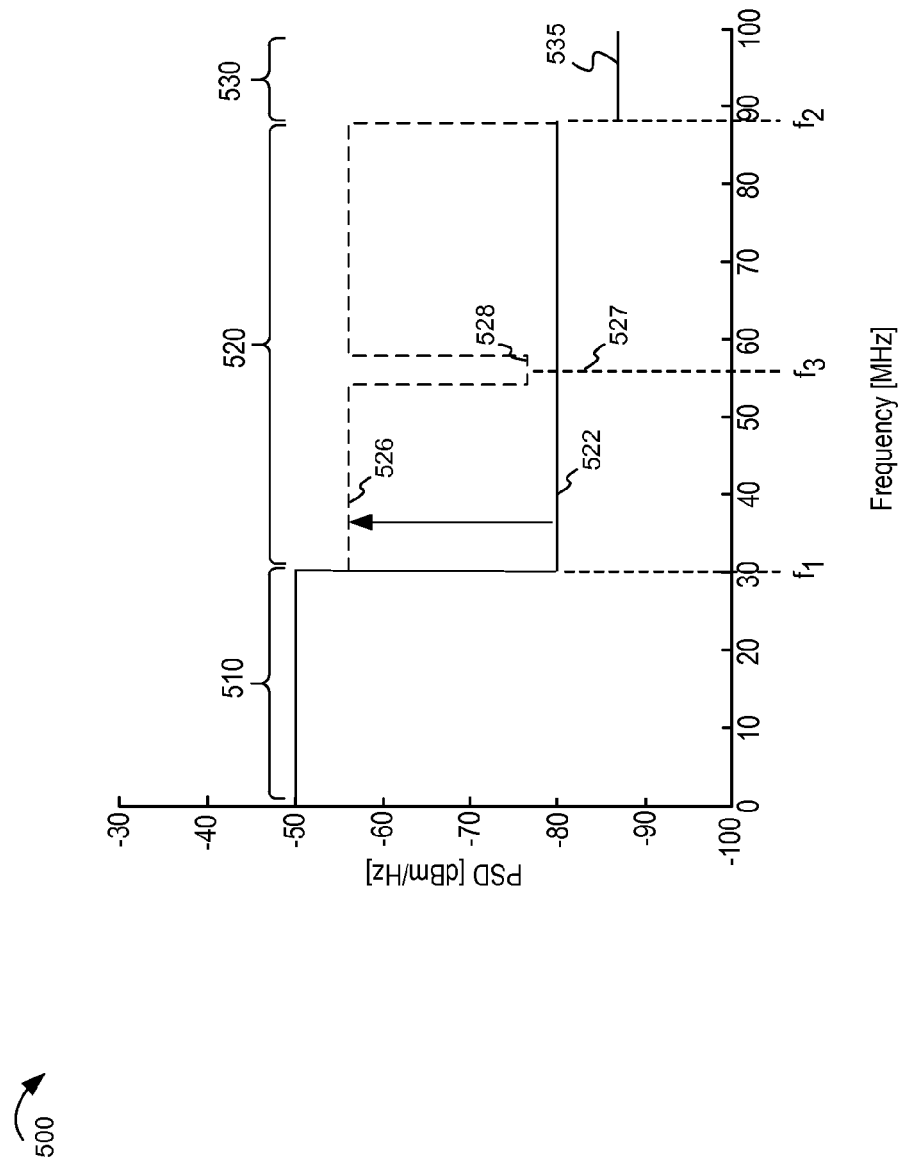
FIG. 5 depicts another frequency diagram and another example IM interference detection test using identified frequencies in accordance with an embodiment of this disclosure.

FIG. 5 depicts another frequency diagram 500 in which particular frequencies may be identified as causing IM interference. For a transmitting device that has a capability to selectively reduce power on individual frequencies, additional performance improvement may be achieved.

The frequency diagram 500 depicts a first frequency band 510, second frequency band 520, and third frequency band 530, similar to corresponding features in FIG. 4. As a result of testing various frequencies in the second frequency band 520, the first device and second device have determined that an identified frequency $f_3$ 527 is associated with causing IM interference for at least part of the third frequency band 530. Whenever a test signal includes the identified frequency 527 above an identified power level 528, the second device detects IM interference above a threshold interference level 535. However, the other frequencies in the second frequency band 520 were not associated with causing IM interference. The first device may notch (e.g., reduce or eliminate power of transmissions) the identified frequency 527, while transmitting at a higher power level 526 for other frequencies in the second frequency band 520.

Figure 6:
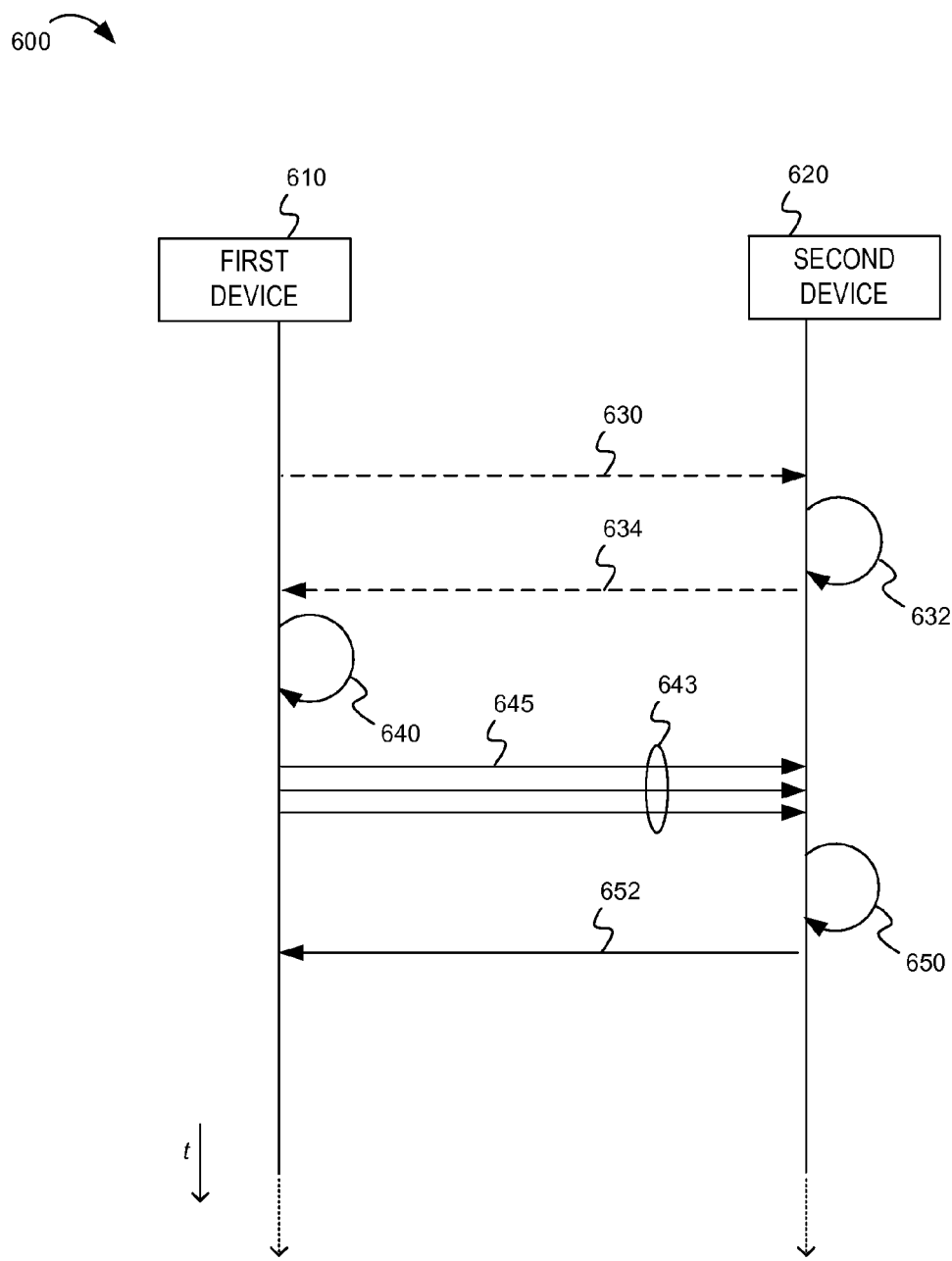
FIG. 6 depicts a message flow diagram in accordance with an embodiment of this disclosure.

FIG. 6 depicts a message flow diagram 600 that includes transmissions between a first device 610 and a second device 620.

At 630, the first device 610 may transmit a test setup message. The test setup message may include a request for capabilities; indicate a test sequence, providing timing/synchronization information, or the like. At 632, the second device 620 may process the test setup message. For example, the second device 620 may configure an IM interference detection module. At 634, the second device 620 may respond with a test acknowledgment message. The test acknowledgment message may also include information about capabilities or configuration of the second device 620.

Depending on timing/synchronization, the first device 610 may wait at 640 for a period of time before sending a first test signal (shown at 645). For example, the first device 610 may postpone the first test signal for a predetermined delay or until an assigned time slot for the testing. The first device 610 may also send a clear-to-send (not shown) indicating that it will use the communications medium, and wait until the communications medium is idle before sending the first test signal. Furthermore, the first device 610 may transmit a preamble or delimiter signal (not shown) prior to sending the first test signal so that only the first device 610 transmits on the communications medium during the first test signal.

Shown at 643, a plurality of test signals may be sent via the communications medium. The test signals may be sent sequentially, such as a series of pilot or test tones sent in a consecutive series of OFDM symbols. However, it should be understood that the test signals may not necessarily occur consecutively. For example, an idle period may occur between each test signal. Alternatively, each test signal may be sent one at time to allow for a feedback message for a previous test signal before sending a next test signal. In another alternative, a reserved time slot may occur periodically in the time domain to allow for a plurality of test signals to be sent at various times between other ongoing communications.

While the test signals are being transmitted at 643, the second device 620 may detect for the presence of IM interference caused by the test signals. At 650, the second device 620 may prepare a results message. The results message may include measured signal levels from the IM interference detection module. Alternatively, the second device 620 may analyze the measured signal levels from the IM interference detection module in view of the power/frequency of the test signals and determine the power levels and/or frequencies which cause IM interference. The results message may indicate power levels and/or frequencies associated with causing IM interference. Alternatively, the results message may indicate acceptable power levels and/or frequencies that do not cause IM interference.

At 652, the results message may be communicated from the second device 620 to the first device 610. In one embodiment, the results message is broadcast via the communications medium so that other devices (not shown) coupled to the communications medium may be made aware of the information included in the results message.

Although the example in FIG. 6 and other figures describe a first device and a second device coordinating to test for IM interference at various power levels and frequencies, it should be understood that in some embodiments, additional devices may be included in an IM interference detection test. A scenario using multiple devices is now described in relation to FIG. 6. For example, the test setup message 630 may be broadcast so that multiple other devices may prepare to detect for IM interference. At 652, a plurality of other devices, including second device 620, may provide results messages back to the first device 610. The first device 610 may utilize all the results messages to generate a table of power level and associated frequencies that are associated with causing IM interference. This may be particularly useful for networks in which a communications medium having multiple segments and each segment is associated with different nonlinearities.

Figure 7:
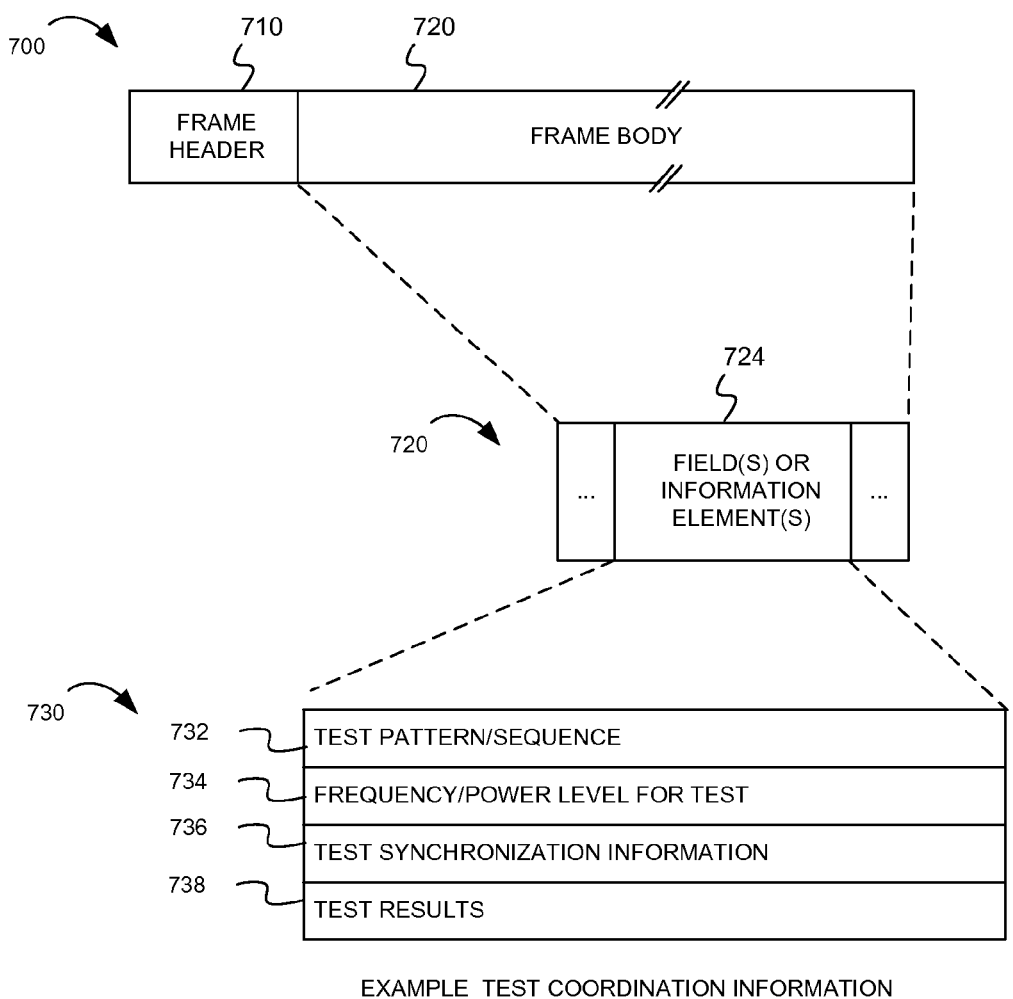
FIG. 7 depicts an example message format in accordance with an embodiment of this disclosure.

FIG. 7 depicts an example message format 700 in accordance with an embodiment of this disclosure. The example message format 700 includes a frame header 710 and frame body 720. The frame body 720 may include one or more fields or information elements 724. Depending on the type of message, the fields or information element 724 may include different types of test coordination information 730. Example test coordination information 730 may include:

Test pattern/sequence information 732: This information may identify a pattern or sequence. For example, a sequence tag or identifier may be included to identify a previously configured pattern or sequence.

Frequency/power level for test signal 734: This information may indicate a frequency or set of frequencies to be included in a test signal and may indicate a power level for the test signal.

Test synchronization information 736: This information may include timing information to indicate a delay before a start of a test sequence, or to indicate a start time for the test sequence. In one embodiment, the test synchronization information may identify a reserved time slot used for a series of test signals.

Test results 738: A device may provide test results, including frequencies and power levels which are known to cause IM interference when transmitted via the communications medium.

Figure 8:
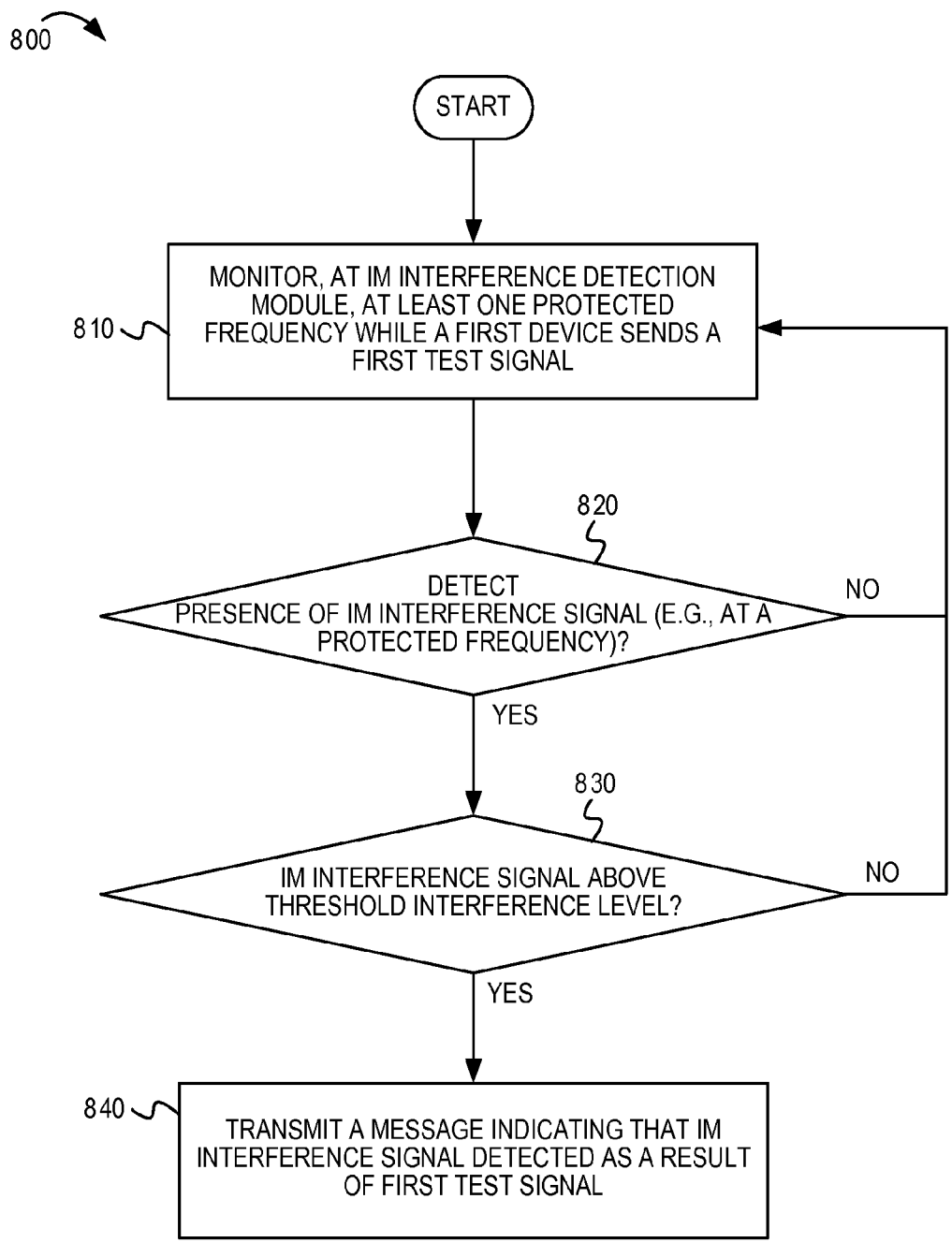
FIG. 8 depicts example operations performed by an IM interference detection module in accordance with an embodiment of this disclosure.

FIG. 8 depicts example operations 800 performed by an IM interference detection module. At 810, the IM interference detection module may monitor at least one protected frequency while a first device sends a first test signal. In one example, the IM interference detection module may be part of a communications unit in the second device. The IM interference detection module may be coupled directly to the communications medium. Alternatively, the IM interference detection module maybe constructed with a separate antenna and circuitry to detect the presence/absence of IM interference at one or more protected frequencies.

In one embodiment, the IM interference detection module may be capable of monitoring a particular protected frequency or a limited number of protected frequencies at a time. The IM interference detection module may be configured to scan a list of protected frequencies to measure the signal level for each protected frequency (or sub-band of frequencies). In another example, a more advanced IM interference detection module may detect IM interference at a plurality of protected frequencies or frequency band simultaneously.

At 820, the IM interference detection module may determine whether presence of IM interference signal is detected at a protected frequency. If no IM interference signal is detected, the flow returns to block 810. If an IM interference signal is detected, the flow continues to decision 830. In one embodiment, the IM interference detection module may distinguish between an IM interference signal and a desired signal (e.g., typical FM radio signal) that is not associated with IM interference. For example, typically IM interference tends to have a wider signal width than the desired signal. To distinguish between IM interference and a desired signal, the IM interference detection module may determine the width (e.g., frequency range) of a detected signal to determine if the detected signal is an IM interference signal. In another embodiment, the IM interference detection module may determine the baseline signal strength associated with the desired signal and determine that a detected signal includes IM interference when the detected signal is above the baseline signal strength.

At 830, the IM interference detection module may determine whether the IM interference signal has signal strength above a threshold interference level. The threshold interference level may be preconfigured or predetermined threshold interference level. Alternatively, the threshold interference level may be dynamically determined in relation to the baseline power level for ambient signals at the protected frequency. Alternatively, the threshold interference level may be specified by regulatory or standards setting bodies. The threshold interference level may allow for small amounts for IM interference that does not negatively impact the quality of a desired signal at the protected frequency. If the IM interference signal strength is below the threshold interference level, the flow returns to block 810. If the IM interference signal strength is below the threshold interference level, the flow continues to block 840.

At block 840, the IM interference detection module may transmit a results message indicating that IM Interference signal detected as a result of first test signal. In some embodiments, the results message may be generated and transmitted after each test signal. In other embodiments, the results message may be generated and transmitted after a plurality of test signals.

FIGS. 9A-9D depict various pattern and stepwise sequences that may be used to isolate a particular frequency or frequencies that cause IM interference. If an IM interference test is used to identify a particular frequency or frequencies associated with causing IM interference, then a transmitting device may be able to notch the identified frequency and allow other frequencies to use a higher power level.

Each Figure shows an IM interference detection test sequence having a plurality of test signals. For simplicity, only eight (8) test frequencies are described, labeled $F_1$ to $F_8$. However, the concepts described are applicable to systems which utilize more or less test frequencies. Each test signal is identified by $T_x$, where x is a test signal number in a sequential order.

Figures 9A, 9B, 9C, 9D:
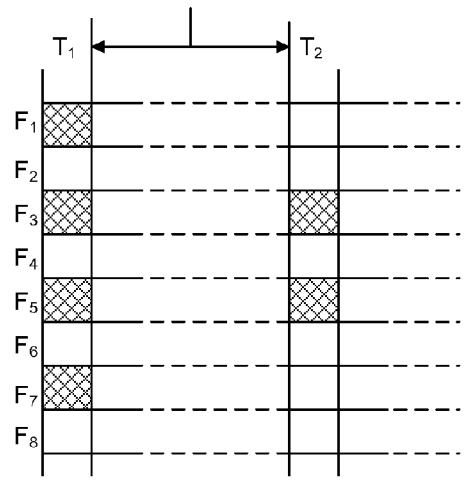
FIGS. 9A-9D depict example IM interference detection tests in accordance with an embodiment of this disclosure.

In FIG. 9A, a pattern test sequence 901 is depicted. The first test signal $T_1$ includes odd numbered frequencies. The second test signal $T_2$ includes even numbered frequencies. The third and fourth test signals $T_3$, $T_4$ includes every third frequency, offset. It should be understood that a variety of patterns might be conceived for an IM interference detection test sequence. In the pattern test sequence 901 shown in FIG. 9A, a second device might be able to determine that if IM interference is detected for the first and fourth test signals $T_1$, $T_4$ and IM interference is not detected during the second and third test signals $T_2$, $T_3$, then it is likely that a transmission at frequency $F_5$ caused the IM interference. Similar heuristics might be performed to compare results with a sequence of patterns in test signals to determine particular frequencies that are associated with causing IM interference.

In FIG. 9B, a step-wise test sequence 902 is depicted. The first test signal $T_1$ includes frequency $F_1$. The second test signal $T_2$ includes frequency $F_2$. And so forth. Depending on which test signal is associated with detected IM interference, the second device may identify a particular frequency. In some embodiments, the step-wise test may include at least two frequencies transmitted for each test signal.

In FIG. 9C, an IM interference detection test sequence might attempt to identify particular frequencies that are expected to cause IM interference. For example, an IM interference test module may perform various calculations to determine harmonic multiples of frequencies, and determine sum, product, or difference calculations for the fundamental frequencies and harmonic multiples. The IM interference test module may prioritize or rank the combinations of component frequencies that are likely to produce IM interference for a protected frequency. In FIG. 9C, an example test sequence 903 is depicted. In a first test signal $T_1$, frequencies $F_3$ and $F_6$ may be included. In the second test signal $T_2$, frequencies $F_1$ and $F_6$ may be included. And so on. FIG. 9c illustrates conceptually that a test sequence might be prepared with some calculations to minimize the quantity of test signals needed to isolate IM interference causing frequencies.

In FIG. 9D, a test sequence 904 might include dynamic test signals. A first test signal $T_1$ might be transmitted by the first device and measured by the second device. The results of the first test might be analyzed to determine which protected frequency experienced IM interference, or to compare with previous results for particular frequencies. In the example of FIG. 9D, the results of the first test signal $T_1$ suggest that frequencies $F_3$ and/or $F_5$ might be associated with causing IM interference. In the second test signal $T_2$, the suspected frequencies might be included to validate that they cause IM interference or to further refine analysis of suspected frequencies. A plurality of test signals might be dynamically prepared by analyzing the results of each test signal and previous testing results.

FIGS. 1-9D and the operations described herein are examples meant to aid in understanding various embodiments and should not be used to limit the scope of the claims. Embodiments may perform additional operations, fewer operations, operations in parallel or in a different order, and some operations differently.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more non-transitory computer readable medium(s) may be utilized, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable medium for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
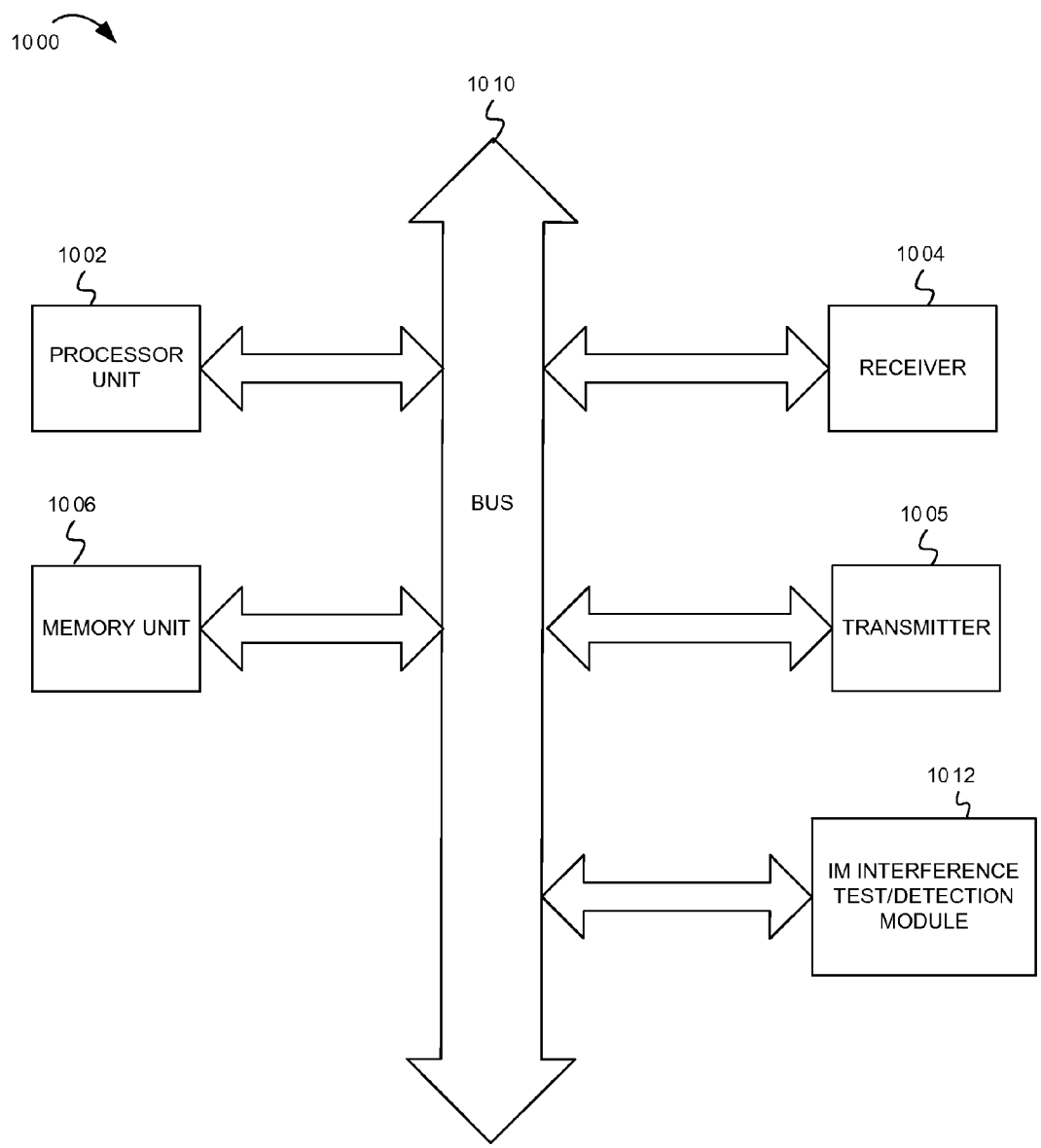
FIG. 10 depicts an example electronic device capable of performing various embodiments of this disclosure.

FIG. 10 is an example block diagram of one embodiment of an electronic device 1000 capable of implementing various embodiments of this disclosure. In some implementations, the electronic device 1000 may be an electronic device such as a laptop computer, a tablet computer, a mobile phone, a powerline communications device, a gaming console, or other electronic systems. In some implementations, the electronic device may comprise functionality to communicate across multiple communications networks (which form a hybrid communications network). The electronic device 1000 includes a processor unit 1002 (possibly including multiple processors, multiple cores, multiple nodes, and/or implementing multi-threading, etc.). The electronic device 1000 includes a memory unit 1006. The memory unit 1006 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1000 also includes a bus 1010 (e.g., PCI, ISA, PCI-Express, Hyper-Transport®, InfiniBand®, NuBus, AHB, AXI, etc.). The electronic one or more network interfaces that may be a wireless network interface (e.g., a WLAN interface, a Bluetooth® interface, a WiMAX interface, a ZigBee® interface, a Wireless USB interface, etc.) or a wired network interface (e.g., a powerline communications interface, an Ethernet interface, etc.). The electronic device 1000 may include a transmitter 1005 and a receiver 1004. Together the transmitter 1005 and receiver 1004 may comprise a network interface. The electronic device 1000 may include an IM interference test/detection module 1012 (such as IM interference test module 114 or IM interference detection module 126). The IM interference test/detection module 1012 may implement various embodiments described in the forgoing figures.

Any one of these functionalities may be partially (or entirely) implemented in hardware and/or on the processor unit 1002. For example, the functionality may be implemented with an application specific integrated circuit, in logic implemented in the processor unit 1002, in a co-processor on a peripheral device or card, etc. Further, realizations may include fewer or additional components not illustrated in FIG. 10 (e.g., video cards, audio cards, additional network interfaces, peripheral devices, etc.). The processor unit 1002, the memory unit 1006, transmitter 1005, receiver 1004, and communications unit 1008 may be coupled to the bus 1010. Although illustrated as being coupled to the bus 1010, the memory unit 1006 may be directly coupled to the processor unit 1002.

While the embodiments are described with reference to various implementations and exploitations, it will be understood that these embodiments are illustrative and that the scope of the inventive subject matter is not limited to them. In general, techniques for determining power levels and/or frequencies associated with causing IM interference as described herein may be implemented with facilities consistent with any hardware system or hardware systems. Many variations, modifications, additions, and improvements are possible.

For example, in one embodiment, a system comprises a first device coupled to a communications medium and configured to transmit, to a second device coupled to the communications medium, at least a first test signal comprising transmissions in a first frequency band at a first power level, the first test signal being part of an intermodulation (IM) interference detection test sequence to determine IM interference associated with various power levels of transmissions between the first device and the second device via the communications medium; and the second device coupled to the communications medium and configured to detect for IM interference above a threshold interference level as a result of the first test signal, wherein the IM interference is detected at a second frequency band different from the first frequency band.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for detecting intermodulation (IM) interference, the method comprising:
    transmitting, from a first device coupled to a communications medium to a second device coupled to the communications medium, a test sequence of a plurality of test signals, the test sequence including at least a first test signal for a first set of frequencies and a second test signal for a second set of frequencies;
    receiving feedback from the second device indicating whether the second device has detected IM interference above a threshold interference level as a result of the test sequence; and
    determining IM interference associated with the first set of frequencies and the second set of frequencies based, at least in part, on the feedback.

2. The method of claim 1, further comprising determining a maximum power level for a first frequency band that does not produce IM interference above the threshold interference level for a second frequency band based, at least in part, on the feedback.

3. The method of claim 1, further comprising, prior to transmitting the test sequence:
communicating a test setup message from the first device to the second device.

4. The method of claim 3, wherein the test setup message identifies the first set of frequencies of the first test signal.

5. The method of claim 3, wherein the test setup message indicates the test sequence.

6. The method of claim 1, wherein the test sequence is associated with sequentially testing each of the plurality of test signals at a different power level.

7. The method of claim 1, wherein the test sequence is associated with at least one member of the group consisting of:
a stepwise sequence for a plurality of frequencies, and
a pattern sequence for the plurality of frequencies.

8. The method of claim 1,
wherein transmitting the test sequence comprises transmitting the first test signal at a first power level, the method further comprising:
determining a second power level for the second test signal based at least in part on whether the second device has detected IM interference above the threshold interference level as a result of the first test signal.

9. The method of claim 8,
wherein transmitting the test sequence further comprises transmitting the second test signal at the second power level after transmitting the first test signal at the first power level.

10. The method of claim 1, wherein
at least one frequency of the second set of frequencies is different from the first set of frequencies.

11. The method of claim 1, wherein the first set of frequencies and the second set of frequencies are determined prior to a start of the test sequence.

12. The method of claim 1, further comprising:
determining the second set of frequencies for the second test signal based, at least in part, on the feedback.

13. The method of claim 1, wherein receiving the feedback comprises:
receiving a results message from the second device indicating that IM interference was detected above the threshold interference level in association with an identified power level, an identified frequency, or an identified combination power level and frequency.

14. The method of claim 13, wherein the results message is received as a broadcast message via the communications medium.

15. The method of claim 1, wherein the test sequence is part of an IM interference detection test that is coordinated between the first device and the second device.

16. A first device for communicating via a communications medium, the first device comprising:
a transmitter configured to transmit, from a first device to a second device via the communications medium, a test sequence of a plurality of test signals, the test sequence including at least a first test signal for a first set of frequencies and a second test signal for a second set of frequencies;
a receiver configured to receive feedback from the second device indicating whether the second device has detected IM interference above a threshold interference level as a result of the test sequence; and
an intermodulation (IM) interference test module configured to determine IM interference associated with the first set of frequencies and the second set of frequencies based, at least in part, on the feedback.

17. The first device of claim 16, wherein the IM interference test module is further configured to determine a maximum power level for a first frequency band that does not produce IM interference beyond the threshold interference level for a second frequency band based, at least in part, on the feedback.

18. The first device of claim 16, wherein the IM interference test module is further configured to, prior to transmission of the test sequence, communicate a test setup message from the first device to the second device.

19. The first device of claim 16, wherein the test sequence includes one member of the group consisting of:
a stepwise sequence for a plurality of frequencies, and
a pattern sequence for the plurality of frequencies.

20. The first device of claim 16,
wherein the transmitter configured to transmit the test sequence comprises the transmitter configured to transmit the first test signal at a first power level, and
wherein the IM interference test module is further configured to determine a second power level for a second test signal based at least in part on whether the second device has detected IM interference above the threshold interference level as a result of the first test signal.

21. The first device of claim 20, wherein the transmitter is further configured to, after transmitting the first test signal at the first power level, transmit the second test signal at the second power level.

22. The first device of claim 16, wherein
at least one frequency of the second set of frequencies being different from the first set of frequencies.

23. The first device of claim 16, further comprising:
wherein the receiver configured to receive the feedback comprises the receiver configured to receive a results message from the second device indicating that IM interference was detected above the threshold interference level in association with an identified power level, an identified frequency, or an identified combination of power level and frequency,
wherein the transmitter is configured to limit transmissions for the identified power level, the identified frequency, or the identified combination of power level and frequency.

24. A device for communicating via a communications medium, the device comprising:
a receiver configured to receive, via the communications medium from a first device, a test sequence of a plurality of test signals, the test sequence including at least a first test signal for a first set of frequencies and a second test signal for a second set of frequencies;
a transmitter configured to transmit feedback from to the first device, the feedback indicating whether IM interference was detected above a threshold interference level as a result of the test sequence; and
an intermodulation (IM) interference detection module configured to determine IM interference associated with the first set of frequencies and the second set of frequencies based, at least in part, on the test sequence.

25. The device of claim 24, further comprising:
the receiver configured to receive a test setup message from the first device; and the IM interference detection module configured to detect IM interference based at least in part on the test setup message.

26. The device of claim 24, further comprising:

the IM interference detection module configured to determine an identified power level, an identified frequency, or an identified combination power level and frequency which is associated with causing IM interference above the threshold interference level when transmitted via the communications medium; and wherein the transmitter configured to transmit the feedback comprises the transmitter configured to transmit a results message to the first device indicating the identified power level, the identified frequency, or the identified combination power level and frequency.

27. A non-transitory machine-readable medium having stored therein a program product, which when executed by a processor causes the processor to:

transmit, from a first device coupled to a communications medium to a second device coupled to the communications medium, a test sequence of a plurality of test signals, the test sequence including at least a first test signal for a first set of frequencies and a second test signal for a second set of frequencies;

receive feedback from the second device indicating whether the second device has detected IM interference above a threshold interference level as a result of the test sequence; and determine intermodulation (IM) interference associated with the first set of frequencies and the second set of frequencies based, at least in part, on the feedback.

* * * * *